(12) United States Patent
Clapper

(10) Patent No.: US 7,373,495 B2
(45) Date of Patent: May 13, 2008

(54) HARDWARE CROSS-EMULATION USING PERSONAS

(75) Inventor: Edward O. Clapper, Tempe, AZ (US)

(73) Assignee: Intel Corporation, Santa Clara, CA (US)

( * ) Notice: Subject to any disclaimer, the term of this patent is extended or adjusted under 35 U.S.C. 154(b) by 679 days.

(21) Appl. No.: 09/861,209

(22) Filed: May 17, 2001

(65) Prior Publication Data

US 2002/0171679 A1 Nov. 21, 2002

(51) Int. Cl.
*G06F 9/445* (2006.01)
(52) U.S. Cl. .......................... 713/2; 715/744; 717/176
(58) Field of Classification Search ................ 345/744; 713/2; 717/176
See application file for complete search history.

(56) References Cited

U.S. PATENT DOCUMENTS

| | | | | |
|---|---|---|---|---|
| 6,032,255 A * | 2/2000 | Shim et al. | ..................... | 713/2 |
| 6,167,567 A * | 12/2000 | Chiles et al. | ................ | 717/173 |
| 6,178,503 B1 * | 1/2001 | Madden et al. | ................ | 713/2 |
| 6,349,352 B1 * | 2/2002 | Lea | ............................. | 710/72 |
| 6,496,847 B1 * | 12/2002 | Bugnion et al. | ................ | 718/1 |
| 6,507,762 B1 * | 1/2003 | Amro et al. | ................... | 700/83 |
| 6,604,235 B1 * | 8/2003 | Harrison et al. | ............ | 717/168 |
| 6,658,562 B1 * | 12/2003 | Bonomo et al. | ................ | 713/1 |
| 6,718,464 B2 * | 4/2004 | Cromer et al. | ................. | 713/2 |
| 6,791,467 B1 * | 9/2004 | Ben-Ze'ev | ............. | 340/825.69 |
| 6,839,836 B2 * | 1/2005 | Cole et al. | ..................... | 713/2 |

OTHER PUBLICATIONS

J-Y. Mignolet, S. Vernalde, M. Engels, "A low-power reconfigurable internet appliance", Revue Hf. Electonique, Telecommunications, Issue 4, 2000.*
HAVi Specification, Version 1.0B beta, Nov. 19, 1998.*

* cited by examiner

*Primary Examiner*—Chun Cao
*Assistant Examiner*—Albert Wang
(74) *Attorney, Agent, or Firm*—Joni D. Stutman-Horn

(57) ABSTRACT

An apparatus and method for a device to boot as though it were another device. The various devices have published personas describing their operation. A persona selection interface enables a user to select a remote device as which the local device should reboot. Updated personas can be retrieved from the remote devices themselves, or from a persona server. If the emulated operation requires a resource not locally available, the local device negotiates with the remote device to share the remote resource, and failing that, the local device emulates the resource.

27 Claims, 5 Drawing Sheets

HARDWARE CROSS-EMULATION USING PERSONAS

BACKGROUND OF THE INVENTION

1. Technical Field of the Invention

The present invention relates generally to digital devices and more specifically for a mechanism for various digital devices to offer the functionality and user interface of each other or, in other words, to emulate each other.

2. Background Art

Various emulation techniques are known in the art. For example, a functional simulator is a software model, which models the execution functionality of the emulated or simulated circuit. Microprocessor functional simulators have been used to facilitate the development of software to run on the target microprocessor, prior to the actual availability of the microprocessor. However, the functional model software is running on top of the simulating machine's native software system, including its operating system (OS) and basic input output system (BIOS). When the machine boots, it boots in its native mode, and the functional simulator is executed as an application.

As another example, the pcAnywhere product from Symantec Corporation allows one computer (the local computer) to present the user interface data currently being presented on another computer (the remote computer) on the same network. The user at the local computer can interact with software running on the remote computer just as though the software were running on the local computer, such as by viewing pictures, typing text, and activating graphical user interface (GUI) controls with the mouse. But, again, this emulator is executed as an application running on top of the local machine's native OS and BIOS.

Multi-boot technologies are also known in the art. For example, some Microsoft Windows machines are equipped with a multi-boot capability which enables the user to select, at boot time, which OS to boot, such as a choice between Windows or DOS. However, the underlying BIOS remains the same, and provides access to the same underlying hardware.

In none of these cases is the local machine able to actually boot as though it were the remote machine.

BRIEF DESCRIPTION OF THE DRAWINGS

The invention will be understood more fully from the detailed description given below and from the accompanying drawings of embodiments of the invention which, however, should not be taken to limit the invention to the specific embodiments described, but are for explanation and understanding only.

DETAILED DESCRIPTION

Figure 1:
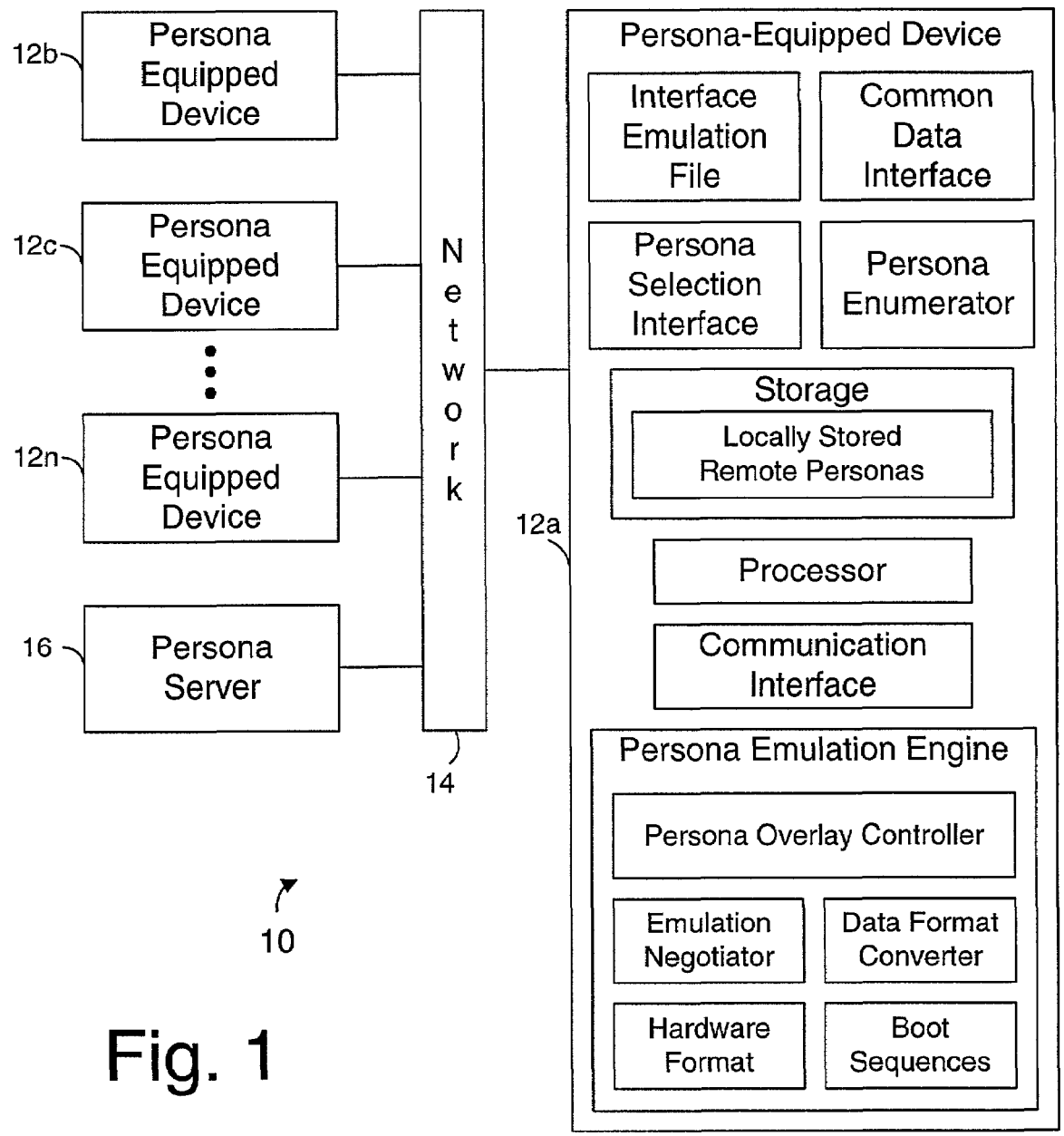
FIG. 1 shows one embodiment of a system and devices equipped with this invention.

FIG. 1 illustrates one embodiment of a system 10 constructed according to the principles of this invention. The system includes a plurality of devices 12 which are equipped with the ability to boot with one another's personas. The devices are coupled over a network 14. The network may include a local area network (LAN), wide area network (WAN), the internet, or any other suitable connectivity system. The various devices may be coupled to the network using, for example, cable, wireless, twisted pair telephone line, digital subscriber line (DSL), cellular, satellite, or any other suitable mechanism. In some embodiments, the system may further include a persona server 16 which provides some of the persona-related functionalities described below. In these embodiments, the individual devices 12 may be simplified, relying on the persona server for services.

An exemplary embodiment of a persona equipped device 12a is shown in greater detail. The reader will understand that various ones of the other devices 12b-n may individually include some or all of the features of the device 12a.

The persona equipped device (PED) may include a processor for performing logical operations of the device, such as the execution of software, loading and execution of BIOS and OS, and so forth. The PED includes a communication interface adapted for connecting to the network using suitable connection and signaling technologies. The PED includes storage, such as a hard disk, compact disc (CD), CD read-only memory (CD-ROM), CD recordable (CD-R), CD rewriteable (CD-RW), digital video disc (DVD), tape, random access memory (RAM), read-only memory (ROM), flash memory, other suitable storage, or combinations thereof. The storage is used to hold, for example, locally stored copies of remote devices' personas, which have been received from the remote devices and/or from the persona server.

The PED further includes an interface emulation file, which includes a definition of the local machine's own persona for communication to the other devices and/or to the persona server. The PED may include a persona enumerator, which ascertains which other persona equipped devices are on the network. Alternatively, the enumeration may be performed by the persona server. The enumeration may be performed in various ways. In one embodiment, the PED sends a "ping" to each previously-seen device. If they are on-line, they will individually respond to the PED. In another embodiment, the PED may send a global inquiry of the form "who is present?" and the individual devices will reply and identify themselves. In another embodiment, the enumeration is not performed in inquiry-answer form, but may be done in an announcement form, where each device announces "I am here" when it comes on-line, or perhaps at periodic intervals.

The PED further includes a persona selection interface mechanism via which the user can select a persona for the PED to adopt, at boot time or upon reset or in some cases upon activation of a "switch identity" button or the like (not shown).

The PED includes a persona emulation engine, which may be built in hardware, software, or a combination. The persona emulation engine includes an emulation negotiator, a data format converter, a persona overlay controller, a hardware format emulation mechanism, and storage for boot sequences. The boot sequences could alternatively be stored in the main storage.

Aspects of persona which might include, by way of example only: color depth, audio sample rate, audio format, audio codec, video frame X and Y size, video frame rate, presence of universal serial bus, presence of audio output, audio size, audio bitrate, presence of coprocessor, network protocol, graphical user interface map, menu map, correlation of buttons to actions, storage size, presence of keyboard, storage shutdown time for power management, screen dim time for power management, hardware password, custom uniform resource locators (URLs), user profiles, user preferences, email settings, Windows "favorites", and the like.

Figure 2:
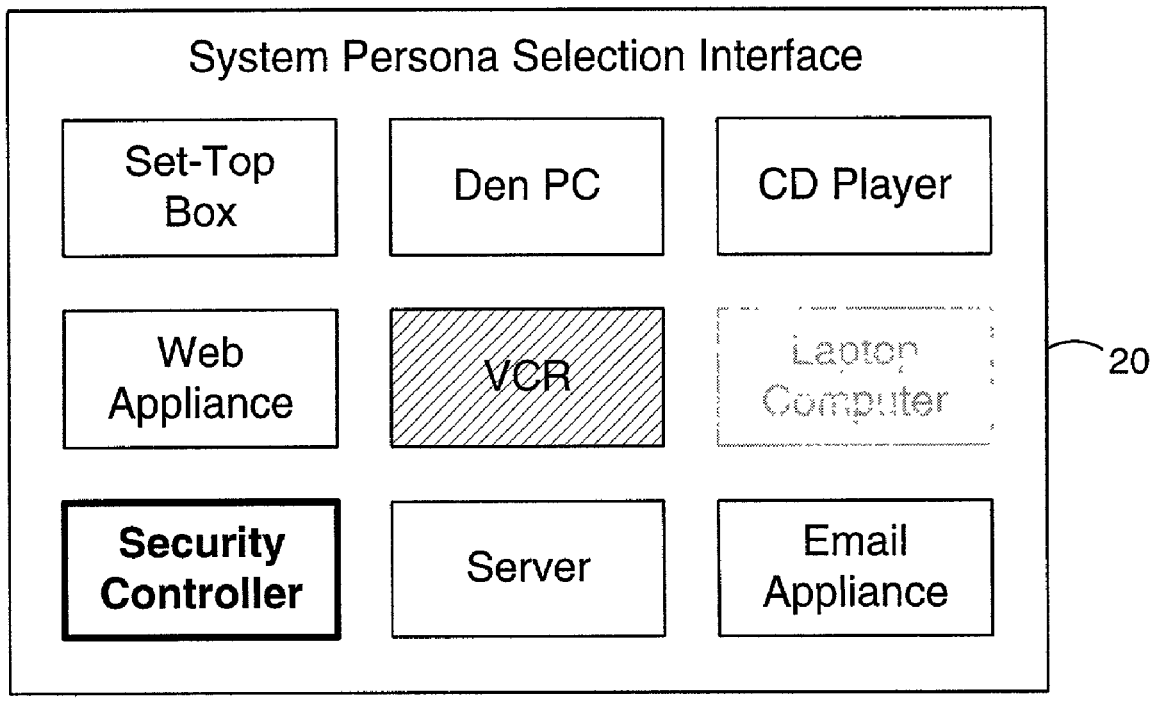
FIG. 2 shows an exemplary embodiment of a persona selection interface.

FIG. 2 illustrates one simple, exemplary embodiment of a system persona selection interface which the PED may present to the user upon bootup, reset, or the like. The reader will appreciate that there are many different schemes via which the user may select a device for emulation. In the example shown, the system persona selection interface presents the user with a list, such as in the form of GUI buttons or other such controls, representing all of the other devices as which the PED may be booted. Such other devices connected to the PED via the network might include, for example, a television cable set-top box, a personal computer (PC) located in another room in the house such as the den, a CD player, a web appliance for surfing the web, a video cassette recorder (VCR), a laptop computer whose location may change and may be unknown at any particular moment, a home security system controller, a home central server computer, and an email appliance.

The system persona selection interface may present different information about the various devices, graphically or otherwise. In the illustrative example shown, the selection button for the laptop computer is grayed out, indicating that the laptop computer is presently unavailable on the system and that the PED cannot boot as the laptop computer when the laptop computer is not available. This might be the case, for example, when it would be undesirable to have the user take some action on the PED booted as the laptop, and yet not have that action actually take place on the laptop, such as the deletion of a file or the creation of a new contact in an address book.

As another example, the selection button for the VCR is hashed through, indicating that the PED can no longer boot as the VCR, because the VCR's published persona has expired. In some embodiments, the user might be required to pay a fee to re-enable emulation of the VCR on the PED, such as if the VCR vendor is providing the emulation as a subscription service.

As another example, the selection button for the security controller is highlighted, indicating that the security controller has announced that it has a new version of its persona available for remote devices to use. In some embodiments, it may be optional whether to upgrade the PED's locally stored copy of the security controller's persona. In other embodiments, it may not.

Figure 3:
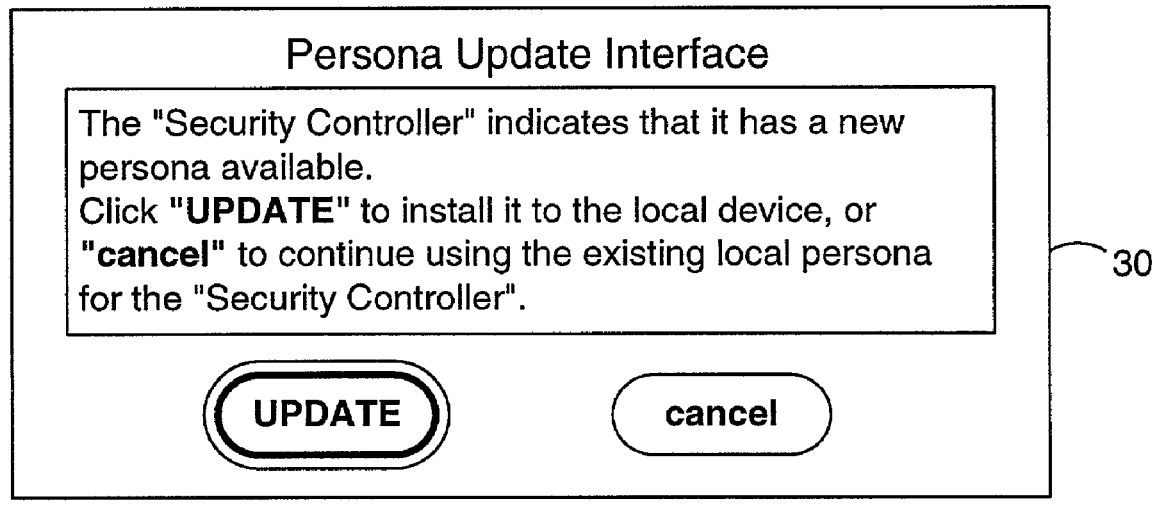
FIG. 3 shows an exemplary embodiment of a persona update interface.

FIG. 3 illustrates an example of a persona update interface, such as might be presented if the user were to select the security controller for emulation (in FIG. 2). The persona update interface may provide an explanation of what the security controller has announced, such as, in the example shown, that the security controller has announced the availability of a new persona, and that the updating of the locally stored copy is optional. The persona update interface may further provide controls consistent with this dialog, such as, in the example shown, an "UPDATE" button and a "cancel" button. If the "UPDATE" button is selected, the security controller's newly announced persona will be fetched and stored in the PED's storage, and then used to reboot the PED with the new persona of the security controller. If the "cancel" button is selected, the PED will be rebooted using the prior version of the security controller's persona.

Figure 4:
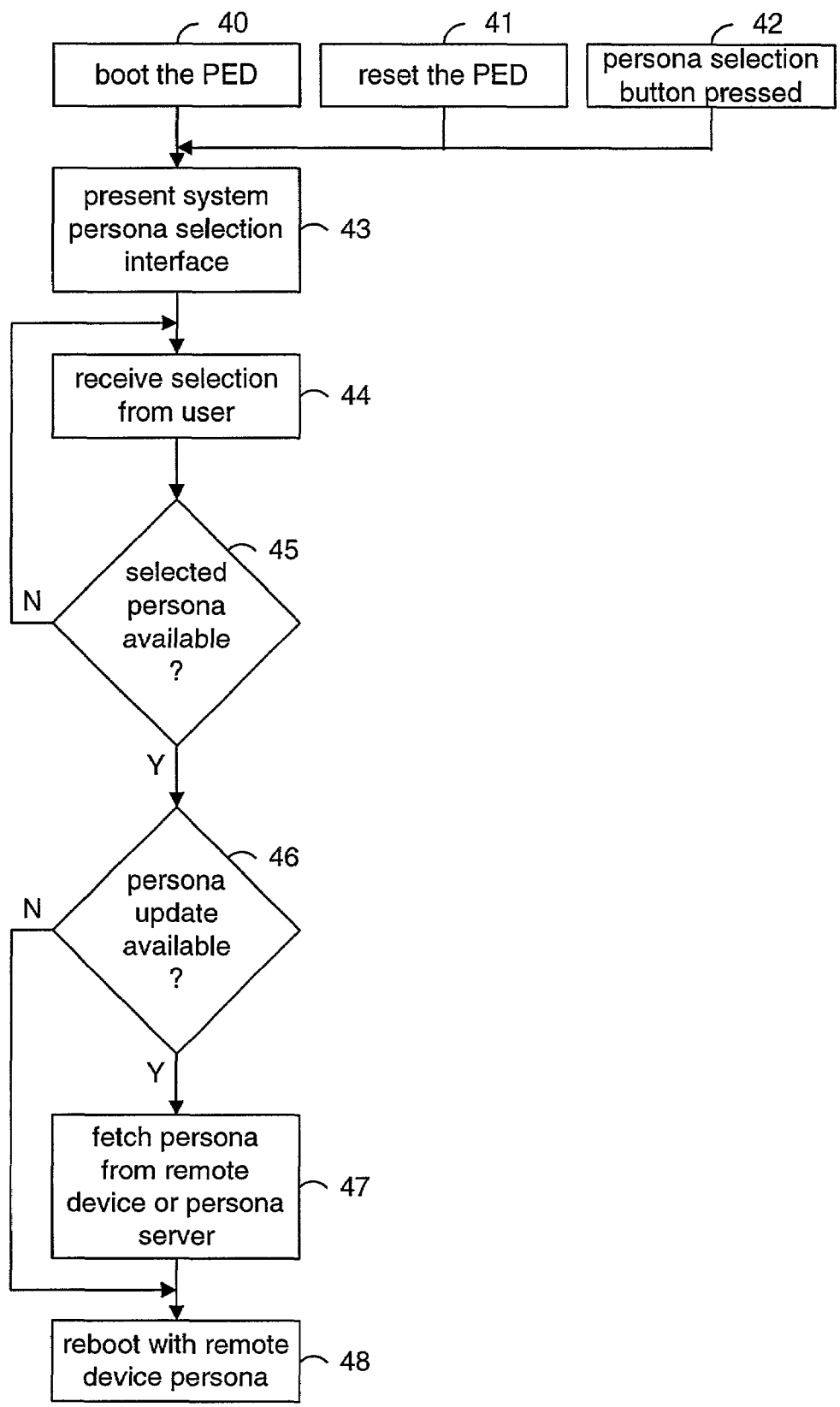
FIG. 4 shows one embodiment of a method of selecting another device's persona.

FIG. 4 illustrates one exemplary method of selecting another device's persona with which to reboot. The local PED has been booted (40), or reset (41), at the user has pressed a persona selection button (42). The PED) presents (43) the user with the persona selection interface, such as that shown in FIG. 2. The user makes a selection which is received (44) by the PED. If (45) the user has selected an unavailable remote device, or one which cannot presently be emulated on the PED, the user is prompted for another selection. But if the user has made a valid choice, the PED then checks (46) whether a persona update is available for the selected remote device. If there is an updated persona available and desired, it is fetched (47) by the PED (such as shown in FIG. 3), either from the remote device itself or from a persona server, or perhaps from another source such as a CD-ROM. Finally, the PED) is rebooted (48) using the existing or updated persona of the selected remote device.

Figure 5:
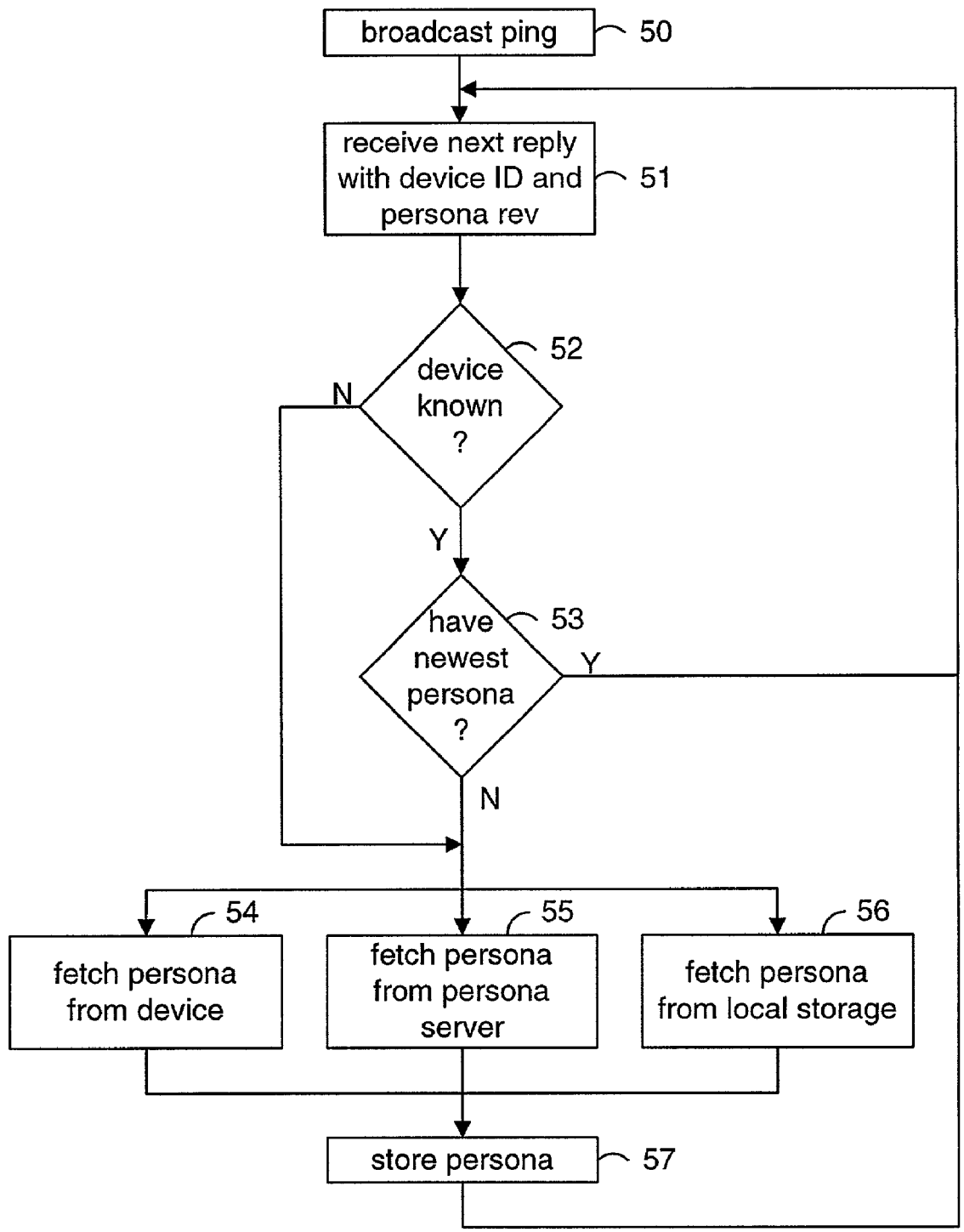
FIG. 5 shows one embodiment of a method of device enumeration and persona collection.

FIG. 5 illustrates one exemplary method of device enumeration. In the example shown, the PED broadcasts (50) a ping on the network, inquiring as to what devices are up and available. The PED receives (51) a reply from one of the devices or from a persona server. The reply may include an identification of the remote device, as well as an identification of the newest revision of the remote device's published persona. If (52) that remote device is known to the PED, and if (53) the PED already has the newest revision of the persona, no further action is required, and the PED can return to receiving additional ping replies. If either of those conditions is not met, the PED will fetch the newest revision of the remote device's persona, either from the remote device itself (54), or from a persona server (55), or from local storage (56). In some embodiments, the PED may come pre-equipped with a supply of personas, such as those for widely available devices. These canned personas may reside in the PED's storage, or may be on e.g. a CD-ROM, perhaps in a compressed format such as a Windows CAB file. Finally, the PED stores (57) the new persona to its local storage.

Figure 6:
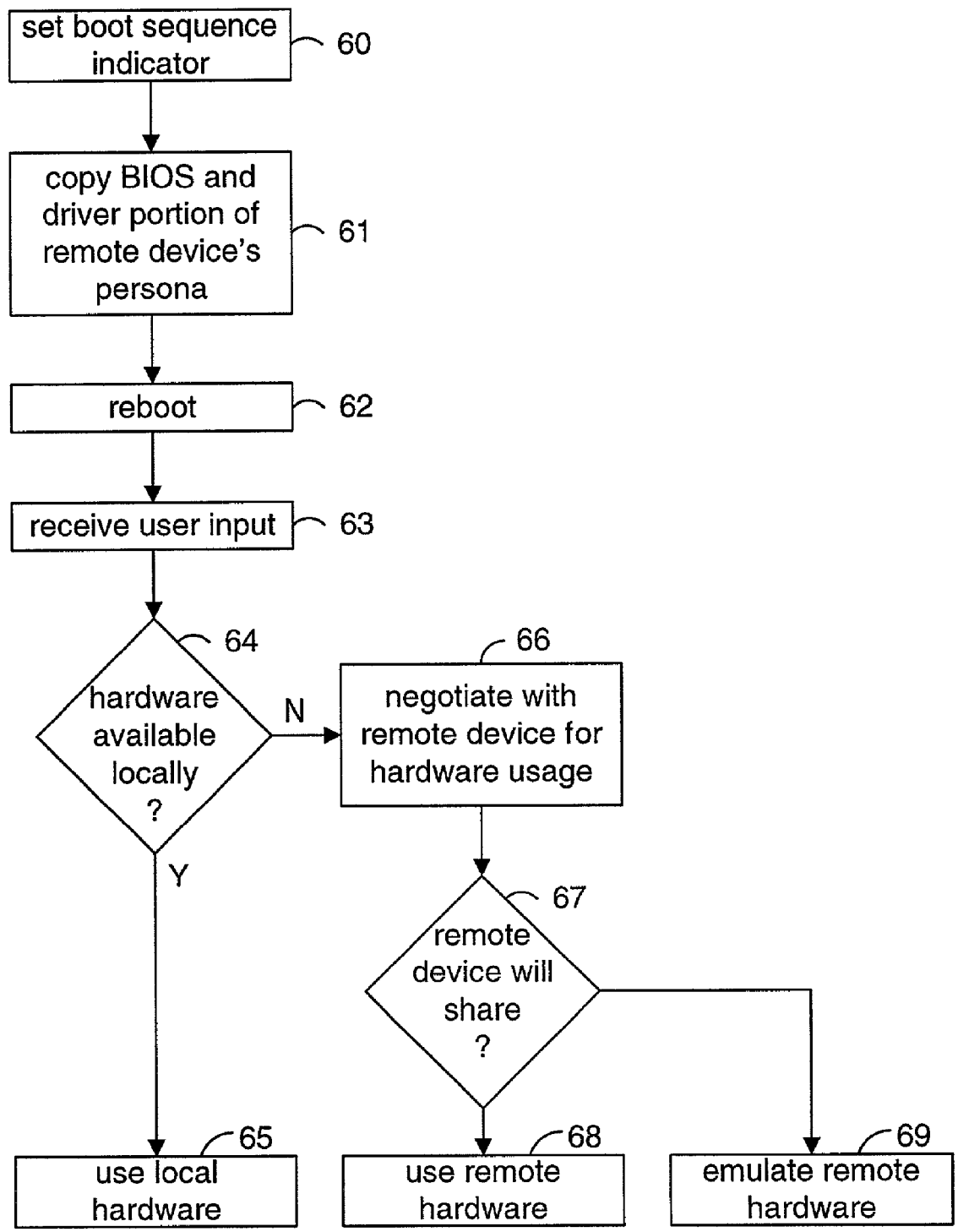
FIG. 6 shows one embodiment of booting and operating with the persona of a remote device.

FIG. 6 illustrates an exemplary embodiment of a method for rebooting and operating under the remote device's persona. Prior to rebooting, the PED may set (60) a boot sequence indicator, to control the booting procedure of a subsequent reboot. The PED may also copy (61) portions of the remote device's BIOS and driver and perhaps OS to the PED's BIOS etc. storage. Upon reboot (62), these portions of the remote device's BIOS, OS, and driver will be used as though they were on their "native" machine.

As execution of the remote device's applications and functionality proceeds, the PED may receive (63) input or otherwise reach a point where the PED needs to determine whether (64) the PED is equipped with the same hardware as the emulated remote device. For example, the user may have, using the GUI of the remote device (e.g. a television) as presented locally on the PED, selected a feature which the locally stored persona of the remote device indicates as requiring specialized hardware (e.g. a digital cable tuner). If the PED has the same or sufficiently similar hardware, execution can proceed (65) using the local hardware. But if this required hardware is not available locally, the PED may negotiate (66) with the remote device for sharing or slaving of the particular hardware. If (67) the remote device is able share or slave its hardware, then the PED will continue executing and use (68) the remote device's hardware. As one example, the hardware in question may be a special-purpose math processor. If the remote device is not currently executing any programs that require the math processor, it may share the math processor with the PED. The PED can forward data to the remote device over the network, and receive results from the remote device over the network, without the mathematical calculations having been done locally at the PED at all. If, however, the remote device is unable to share or slave the hardware, the PED may be able to emulate (69) the functionality of the missing hardware. For example, the PED may be able to perform the mathematical calculations in software, albeit perhaps at a reduced performance or other penalty. In some cases, even emulation may not be possible, and execution of that application may have to be halted. In extreme cases, emulation of the remote device may have to be aborted; in such cases, the PED will revert its boot sequence indicator and BIOS etc. to its own "native" mode, and reboot. Alternatively, it may present the system persona selection interface again to the user, for the user to pick a different device to emulate.

The reader should appreciate that drawings showing methods, and the written descriptions thereof, should also be understood to illustrate machine-accessible media having recorded, encoded, or otherwise embodied therein instructions, functions, routines, control codes, firmware, software, or the like, which, when accessed, read, executed, loaded into, or otherwise utilized by a machine, will cause the machine to perform the illustrated methods. Such media may include, by way of illustration only and not limitation: magnetic, optical, magneto-optical, or other storage mechanisms, fixed or removable discs, drives, tapes, semiconductor memories, organic memories, CD-ROM, CD-R, CD-RW, DVD-ROM, DVD-R, DVD-RW, Zip, floppy, cassette, reel-to-reel, or the like. They may alternatively include down-the-wire, broadcast, or other delivery mechanisms such as Internet, local area network, wide area network, wireless, cellular, cable, laser, satellite, microwave, or other suitable carrier means, over which the instructions etc. may be delivered in the form of packets, serial data, parallel data, or other suitable format. The machine may include, by way of illustration only and not limitation: microprocessor, embedded controller, PLA, PAL, FPGA, ASIC, computer, smart card, networking equipment, or any other machine, apparatus, system, or the like which is adapted to perform functionality defined by such instructions or the like. Such drawings, written descriptions, and corresponding claims may variously be understood as representing the instructions etc. taken alone, the instructions etc. as organized in their particular packet/serial/parallel/etc. form, and/or the instructions etc. together with their storage or carrier media. The reader will further appreciate that such instructions etc. may be recorded or carried in compressed, encrypted, or otherwise encoded format without departing from the scope of this patent, even if the instructions etc. must be decrypted, decompressed, compiled, interpreted, or otherwise manipulated prior to their execution or other utilization by the machine.

Reference in the specification to "an embodiment," "one embodiment," "some embodiments," or "other embodiments" means that a particular feature, structure, or characteristic described in connection with the embodiments is included in at least some embodiments, but not necessarily all embodiments, of the invention. The various appearances "an embodiment," "one embodiment," or "some embodiments" are not necessarily all referring to the same embodiments.

If the specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

Those skilled in the art having the benefit of this disclosure will appreciate that many other variations from the foregoing description and drawings may be made within the scope of the present invention. Indeed, the invention is not limited to the details described above. Rather, it is the following claims including any amendments thereto that define the scope of the invention.

What is claimed is:

1. An emulation apparatus for communicating with at least one external device, the emulation apparatus comprising:
   a communication interface for connecting to the at least one external device;
   a persona selection interface for enabling a user to select between a persona of the apparatus and a persona of one of the at least one external device;
   storage coupled to the persona emulation engine to store at least one locally stored copy of a persona defining the at least one external device, the persona to be received from one of the at least one external device and a persona server, wherein the persona comprises information sufficient to emulate operations of the at least one external device on the emulation apparatus; and
   a persona emulation engine of the emulation apparatus, coupled to the communication interface and the persona selection interface, for booting the emulation apparatus with the persona selected by the user, wherein after booting, the emulation apparatus is to operate as the selected external device.

2. The apparatus of claim 1 further comprising:
   stored in the storage, respective local copies of at least one persona of at least one external device.

3. The apparatus of claim 1 further comprising:
   a processor coupled to the persona emulation engine; and
   stored in the storage, a plurality of boot sequences for execution by the processor in response to the persona selected by the user, wherein each of the plurality of boot sequences corresponds to a respective external device persona, and wherein booting of the emulation apparatus with the selected persona boots the emulation apparatus with a boot sequence corresponding to the selected external device.

4. The apparatus of claim 1 further comprising:
   a persona enumerator for determining whether other persona equipped external devices are coupled to the communication interface.

5. The apparatus of claim 4 wherein the persona enumerator comprises:
   means for sending a ping to previously seen external devices over the communication interface.

6. The apparatus of claim 4 wherein the persona enumerator comprises:
   means for sending a global inquiry to elicit identifying responses from external devices over the communication interface.

7. The apparatus of claim 4 wherein the persona enumerator comprises:
   means for announcing the apparatus's presence to external devices over the communication interface.

8. The apparatus of claim 1 further comprising:
   a data format converter; and
   means for hardware format emulation.

9. The apparatus of claim 8 further comprising:
an interface emulation file coupled to the persona selection interface.

10. The apparatus of claim 1 further comprising:
means, responsive to the apparatus having been booted as an external device which includes a resource not provided by the apparatus, for accessing that resource over the communication interface.

11. An apparatus comprising:
a processor, the processor to execute a persona emulation engine for emulating personas of a plurality of external devices;
storage coupled to the processor for storing a plurality of locally stored copies of remote personas of respective external devices, each remote persona defining the respective external device and comprising information sufficient to emulate operations of the at respective external device on the apparatus;
a display;
means, coupled to the processor and the storage, for presenting a persona selection interface on the display, the persona selection interface including identifiers of the external devices, the means enabling a user to select between a persona of the apparatus and the external devices; and
means for booting the apparatus using the locally stored copy of the remote persona of an external device selected by the user via the persona selection interface, wherein each remote persona comprises information sufficient for the apparatus to operate as the respective external device after booting, wherein the means for booting further comprises the persona emulation engine of the apparatus, coupled to the means for presenting a persona selection interface, for booting the apparatus with the persona selected by the user, wherein after booting, the apparatus is to operate as the selected external device.

12. The apparatus of claim 11 wherein the persona selection interface comprises:
a plurality of controls each identifying a respective one of the external devices.

13. The apparatus of claim 12 wherein the persona selection interface comprises:
an indication that a specified external device is not available.

14. The apparatus of claim 12 wherein the persona selection interface comprises:
an indication that a published persona of a specified external device has expired.

15. The apparatus of claim 12 wherein the persona selection interface comprises:
an indication that a specified external device has announced the availability of a remote persona that is newer than a copy of its remote persona presently stored by the apparatus.

16. The apparatus of claim 12 wherein the persona selection interface comprises:
a plurality of graphical user interface buttons each corresponding to a respective external device.

17. A method of operating an apparatus, the method comprising:
the apparatus presenting a persona selection interface to a user, the persona selection interface identifying a plurality of external devices;
receiving from the user a selection of one of the external devices;
checking whether an updated persona is available for the selected external device; and
if an updated persona is available,
retrieving the updated persona from the selected external device, prior to rebooting, and
rebooting being with the undated persona; and
rebooting the apparatus with one of the a persona of the selected external device or the updated persona of the selected external device, wherein upon rebooting, the apparatus is to operate as the selected external device.

18. The method of claim 17 further comprising:
if no persona is available for the selected external device, receiving another selection from the user.

19. The method of claim 17 wherein the retrieving comprises:
receiving the updated persona from a persona server.

20. The method of claim 17 further comprising, prior to rebooting:
setting a boot sequence indicator; and
copying a BIOS and a driver portion of the selected external device's persona.

21. A method of operating an apparatus, comprising:
the apparatus presenting a persona selection interface to a user, the persona selection interface identifying a plurality of external devices;
receiving from the user a selection of one of the external devices;
setting a boot sequence indicator; and
copying a BIOS and a driver portion of the selected external device's persona;
rebooting the apparatus with a persona of the selected external device, wherein upon rebooting, the apparatus is to operate as the selected external device;
if an emulated operation of the selected external device requires a hardware resource,
(A) if the hardware resource is available locally within the apparatus, using the locally available hardware resource,
(B) if the hardware resource is not locally available,
(i) negotiating with the selected external device and responsive to the negotiating,
(a) if the selected external device will share the hardware resource, using the hardware device of the selected external device, and
(b) if the selected external device will not share the hardware resource, locally emulating operation of the hardware resource.

22. A system comprising:
a communication network; and
coupled to the communication network, a plurality of persona equipped devices, each including,
(a) a common data interface,
(b) an interface emulation file,
(c) a persona selection interface,
(d) storage for locally storing copies of remote personas of at least some of the other persona equipped devices,
(e) a processor,
(f) a communication interface,
(g) a persona emulation engine,
wherein upon rebooting, each persona equipped device is to operate as a selected other persona equipped device using a locally stored copy of a remote persona corresponding to the selected persona equipped device.

23. The system of claim 22 wherein each of the persona equipped devices further comprises:
- a persona overlay controller;
- an emulation negotiator;
- a data format converter; and
- a hardware format; and
- a plurality of boot sequences.

24. The system of claim 22 further comprising:
- a persona server coupled to the network for providing updated personas of emulated devices to emulating devices of the plurality of persona equipped devices.

25. A machine accessible storage medium having instructions stored therein which, when executed by a machine, cause the machine to:
- present a persona selection interface to a user, the persona selection interface identifying a plurality of external devices;
- receive from the user a selection of one of the external devices;
- check whether an updated persona is available for the selected external device, and
- if an updated persona is available,
    - retrieve the updated persona from the selected external device, prior to rebooting, and
    - use the updated persona in a reboot; and
- reboot the machine with one of the a persona of the selected external device or the updated persona of the selected external device, wherein upon rebooting, the machine is to operate as the selected external device.

26. The machine accessible storage medium of claim 25 further including therein instructions which, when executed by the machine, cause the machine to:
- if an emulated operation of the selected external device requires a hardware resource,
    - (A) if the hardware resource is available locally within the apparatus, use the locally available hardware resource, and
    - (B) if the hardware resource is not locally available,
        - (i) negotiate with the selected external device and
            - (a) if the selected external device will share the hardware resource, use the hardware device of the selected external device, and
            - (b) if the selected external device will not share the hardware resource, locally emulate operation of the hardware resource.

27. The emulation apparatus as recited in claim 1, wherein the communication interface is used to negotiate with the selected external device to allow the emulation apparatus to access a hardware component controlled by the selected external device.

* * * * *